United States Patent
Van Den Brink et al.

(10) Patent No.: US 6,891,340 B2
(45) Date of Patent: May 10, 2005

(54) TRACKING PICTURE TUBE

(75) Inventors: Hendrikus Bernardus Van Den Brink, Eindhoven (NL); Hans-Helmut Bechtel, Roetgen (DE); Marcellinus Petrus Carolus Michael Krijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/477,862
(22) PCT Filed: May 15, 2002
(86) PCT No.: PCT/IB02/01683
§ 371 (c)(1), (2), (4) Date: Nov. 13, 2003
(87) PCT Pub. No.: WO02/093612
PCT Pub. Date: Nov. 21, 2002

(65) Prior Publication Data
US 2004/0155610 A1 Aug. 12, 2004

(30) Foreign Application Priority Data
May 17, 2001 (EP) .............................................. 01201872

(51) Int. Cl.[7] .............................. G09G 1/04; H01J 29/10
(52) U.S. Cl. ........................ 315/370; 315/366; 315/364; 313/471; 313/413; 313/421

(58) Field of Search .................................. 315/370, 364, 315/366, 5.24, 5.26, 386, 383; 313/471, 413, 421, 422

(56) References Cited

U.S. PATENT DOCUMENTS

| 4,635,107 | A | * | 1/1987 | Turner | 348/812 |
| 6,281,947 | B1 | * | 8/2001 | Teter et al. | 348/742 |
| 6,424,102 | B1 | * | 7/2002 | Holtslag | 315/370 |
| 2002/0171353 | A1 | * | 11/2002 | Holtslag | 313/471 |

FOREIGN PATENT DOCUMENTS

| GB | 2122415 | 1/1984 | ............ H01J/31/20 |

* cited by examiner

Primary Examiner—Tuyet Thi Vo

(57) ABSTRACT

The present invention relates to a tracking picture tube of the type in which comb-shaped electrodes or optical detecting means (12, 13) are used for generating a signal related to the position of an electron beam with respect to the strips (5). The tube is characterized in that the deflection unit is arranged to deflect the beams (21r, 21g, 21b) onto selected strips (22r, 22g, 22b) having coincident sides which neighbour finger portions (14, 15) of the same electrode (12, 13), and the selected strips (22r, 22g, 22b), excited by the electron beams, are separated by at least one unexcited strip, respectively.

12 Claims, 2 Drawing Sheets

TRACKING PICTURE TUBE

FIELD OF THE INVENTION

The present invention relates to a picture tube comprising a screen with a plurality of interspersed sets of parallel strips of light-emitting material, each set emitting light of a specific color when hit by electrons, a plurality of electron guns, each adapted to generate an electron beam associated with the strips in one of said sets of strips, a deflection unit for deflecting each electron beam onto one of the strips in the corresponding set of strips, thereby exciting this strip to emit light, and at least one pair of comb-shaped electron-detecting means with a plurality of interdigitated finger portions extending parallel with the strips, for generating a signal related to the vertical position of an electron beam with respect to the strips.

DESCRIPTION OF THE RELATED ART

The most common type of picture tube comprises a shadow mask, arranged on the inside of the screen on top of the phosphor layer. The shadow mask has the function of shadowing two of the three phosphor areas when the third is being excited by an electron beam. Thus, when the "red" electron beam is activated, the shadow mask shadows the green and blue phosphor areas, etc.

The shadow mask has several drawbacks, for example, it is heavy, costly and absorbs roughly 80% of the electrons emitted from the gun.

There are also cathode ray tubes without shadow masks, sometimes referred to as tracking CRTs.

In such tubes, known from e.g. GB 2122415, the different phosphor areas are arranged in groups of strips, normally with a horizontal extension across the screen, and the electron beams are deflected to land on the correct strips by a system of electrodes located adjacent and in between the phosphor strips. In accordance with the most commonly used arrangement, two electrodes with elongate finger portions are arranged in an interdigitated fashion, so that each phosphor strip is located between finger portions belonging to different electrodes. Each electrode is arranged to detect a signal resulting from electrons landing on the electrode, and the signals from the two electrodes are compared (e.g. subtracted or divided). The relationship between these signals is used to control the beam deflection unit in a feedback position control system.

Basically, there are two different categories of intelligent tracking CRTs, namely:
1) single-beam systems, with only one electron gun, alternately exciting phosphor strips of different colors, and
2) multi-beam systems, where several electron guns are employed, each exciting one of the phosphor strip groups.

The multi-beam systems of course have the advantage of writing red, blue and green information in one sweep.

The latter category, to which the present invention is related, is described in U.S. Pat. No. 2,757,313 and GB 1403061. In both these publications, the method used is to track one of the beams (master beam), and to adjust the assembly of beams based on this position information. According to these documents, only one of the phosphor strips (corresponding to the master beam) needs to be surrounded by electrode finger portions, and the reference signal generated from these portions controls the deflection unit. A problem in this context is to separate the influence of the master beam (e.g. red) on the electrodes from the influence from adjacent beams (e.g. green, blue). Two ways of accomplishing this separation are mentioned in the cited documents, namely 1) modulating the master beam with a specific frequency, and filtering the reference signal, or
2) physically separating the master beam phosphor strips from the adjacent phosphor strips.

Both of these solutions lead to complicated and costly designs.

Moreover, if the master beam is not present, tracking is made impossible.

SUMMARY OF THE INVENTION

It is an object of the present invention to provide a picture tube with satisfactory multi-beam tracking.

It is a further object to provide multi-beam tracking with a simple electrode structure.

It is another object to provide satisfactory multi-beam tracking, even if one or several of the beams are inactivated.

These and other objects are achieved with a picture tube of the type mentioned in the opening paragraph, wherein the deflection unit is arranged to deflect the beams onto selected strips having coincident sides (i.e. sides being equally positioned, such as upper sides or lower sides) which neighbour finger portions of the same electrode, said selected strips, excited by the electron beams, being separated by at least one unexcited strip, respectively.

In this arrangement, the relationship between the signal generated by the detecting means and the position of the beam with respect to the center of the phosphor strip has the same sign for all beams. Any beam that is deflected too high will hit a finger portion belonging to the same detecting means, and the same is true for beams deflected too low. Therefore, the difference signal of the two detecting means in the pair will be proportional to the average of the position error of the beams with respect to the center of their respective phosphor strip, weighted with the current of each beam.

As all beams contribute to the tracking, the tracking is not dependent upon one master beam as in the prior art.

In a preferred embodiment, the beams are separated by only one phosphor strip. This is normally sufficient to achieve the advantages above, and minimizes the beam separation. Especially in the case of three guns and three colors, separation by one strip is preferred.

The detecting means are preferably arranged in such a way that one side of each strip neighbours a finger portion of a first detecting means, and another side of each strip neighbours a finger portion of a second detecting means. This arrangement is easy to implement, and still provides satisfactory detecting performance.

In a conventional tracking picture tube, one phosphor strip of each color (normally three colors) is grouped together, and this group will be hit by the three beams during a sweep from left to right, transforming an analog video information signal to light emitted from the phosphor. As a result of the beam separation according to the invention, i.e. the fact that not all beams land on adjacent phosphor strips, the different beams will be related to video information that is time-shifted.

Therefore, the picture tube preferably comprises means for generating a plurality of time-shifted, color-specific video signals, which are supplied to the electron guns. These time-shifted signals control the electron guns, so that e.g. a beam tracking an upper phosphor strip group will relate to earlier video information than a beam tracking a lower phosphor strip group.

The signals from said pair of detecting means can be used in two separate feedback control arrangements, a first control arrangement being adapted to track and control the plurality of beams simultaneously, and a second control arrangement being adapted to track and control the position of individual beams, said first control arrangement having a higher error update frequency than said second control arrangement. The actual control of the beams is always performed at the same, high frequency, using deflecting means in the first as well as the second control arrangements. The error signal in the second control arrangement is, however, updated less frequently.

This control scheme takes advantage of the fact that high-frequency disturbances normally influence all beams together, while beam-specific errors, for example affecting the relative distance between beams, are normally semi-static. Information on avoiding both types of errors can be obtained from the detecting means, and then used in different control loops.

The second control arrangement controlling, for example, interbeam distance is arranged to distinguish between position signals originating from each respective beam. This can be achieved, for example, by modulating (in position or intensity) one or more of said electron beams with different frequencies, thereby allowing detection of the position of this particular beam.

The second control arrangement preferably also includes memory means for storing the position error of individual beams. This further reduces the need for a high-frequency error update, and ensures that a correction signal is always available, even in a dark scene or at the beginning of a scan.

Thus, by combining the effects of the two control arrangements, a tracking of the beams can be achieved which satisfactorily handles both rapid errors affecting all beams similarly, and semi-static errors affecting the beams individually. Moreover, the tracking of semi-static errors can be performed with fewer measurements in position and/or time.

The detecting means can be conductive electrodes, as described in the prior art, generating an electric potential from the incident electron beams. However, they can also be made of light-emitting material, preferably phosphor, working in the same way as the color phosphor in the screen. The light from these optical detecting means can then be used in e.g. a light sensor to obtain an electric signal.

BRIEF DESCRIPTION OF THE DRAWINGS

These and other aspects of the invention are apparent from the preferred embodiments described with reference to the appended drawings.

DETAILED DESCRIPTION OF THE INVENTION

Figure 1:
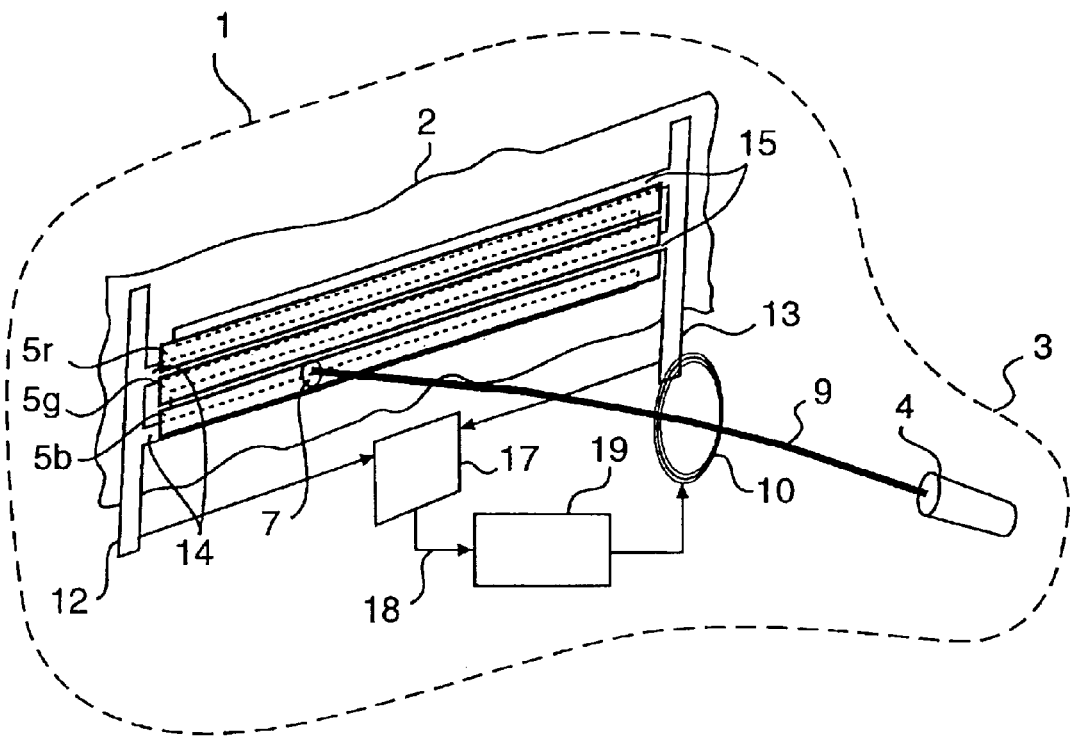
FIG. 1 illustrates the principle of the tracking tube.

The tracking picture tube 1 in FIG. 1 comprises a screen portion 2, provided on its inside with a phosphor layer, and a neck portion 3 accommodating three electron guns 4 (only schematically shown in the drawing). The phosphor layer is constituted by three sets of interspersed horizontal strips 5, adapted to emit the colors red 5r, green 5g and blue 5b, respectively, when hit by electrons from one of the guns 4. The strips are arranged in a regular alternating order, so that two strips representing the same color are always separated by two strips representing the other two colors.

A deflection unit 10 is arranged between the electron guns 4 and the screen, for deflecting the beams 9 to the correct position 7 on the correct phosphor strip 5. The beam 9 from a particular gun 4 is normally always deflected onto the same set of phosphor strips, i.e. in this particular case there is a "red" gun, a "green" gun and a "blue" gun.

Of course, a different number of guns might be used in the tube, and any different combination of colors. For example, two green and one blue gun may be used.

The screen 2 is also provided with two comb-shaped tracking detecting means in the form of conducting electrodes 12, 13. In the case of optical tracking, light-emitting strips similar to the strips 5 may be used as detecting means, and the light emitted from these strips is then collected by one or more light sensors. In the following description, electrical tracking is assumed, but this should not be construed as limiting the protection scope.

Each electrode has a number of finger portions 14, 15 which are arranged in an interdigitated fashion. The electrodes 12, 13 can be formed on the screen 2 using e.g. lithography. In the illustrated example, only one pair of electrodes 12, 13, covering the entire screen, is used, but in some cases it may be advantageous to have more than two electrodes, forming several pairs of interdigitated comb structures on the screen 2.

The finger portions 14, 15 extend between the phosphor strips 5 so that each strip along the length of the electrodes neighbours one finger portion from each electrode 12, 13, one along the upper side and one along the lower side.

Therefore, an electron beam 9 hitting the center of a phosphor strip 5 will transfer an equal electric charge to the finger portions 14, 15 on each side of this strip. Any deviation from the center will, however, result in a larger electric charge transferred to one of the electrodes 12, 13, thereby creating a potential difference that can be detected by a comparator 17. The output 18 from the comparator 17 thus relates to the vertical position of a beam with respect to the adjacent phosphor strips.

The principle of the tracking tube is to use the output 18 from the comparator 17 to control the deflection unit 10.

Figure 2:
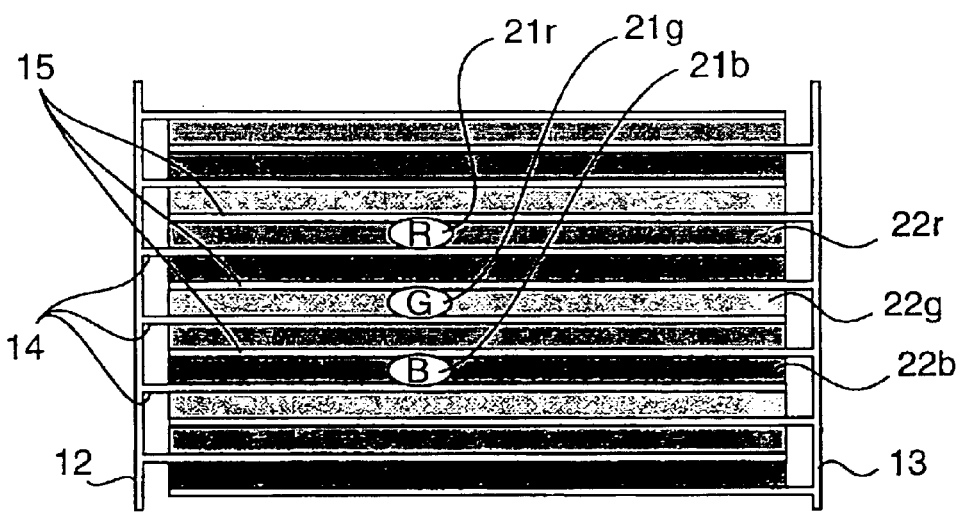
FIG. 2 shows the position of the electron beams with respect to the phosphor strips according to an embodiment of the invention.

FIG. 2 illustrates how the beams from the electron guns land on the phosphor strips and form excited spots 21r, 21b, 21g. In the conventional case, the three beams are deflected to hit a green, a blue and a red beam adjacent to each other. According to the invention, the three beams are instead deflected to phosphor strips 22r, 22b, 22g separated from each other. In the case shown in FIG. 2, the upper beam is shifted one phosphor strip upwards and hits a red strip 22r instead of hitting a blue strip. Similarly, the lower beam is shifted downwards, and hits a blue strip 22b instead of a red strip. The central beam remains deflected onto a green strip 22g.

As is clear from FIG. 2, this has the consequence that all beams have identical electrode relationships, with coincident sides of each strip 22r, 22b, 22g neighbouring finger portions 14, 15 belonging to the same electrode 12, 13. More specifically, the lower side of each phosphor strip neighbours a finger portion from the first electrode 12, while the upper side neighbours a finger portion from the second electrode 13. Therefore, an identical type of position error (up or down) in different beams will result in the same type of electrical potential (same sign), and therefore the same type of output 18 from the comparator 17.

Figure 3:
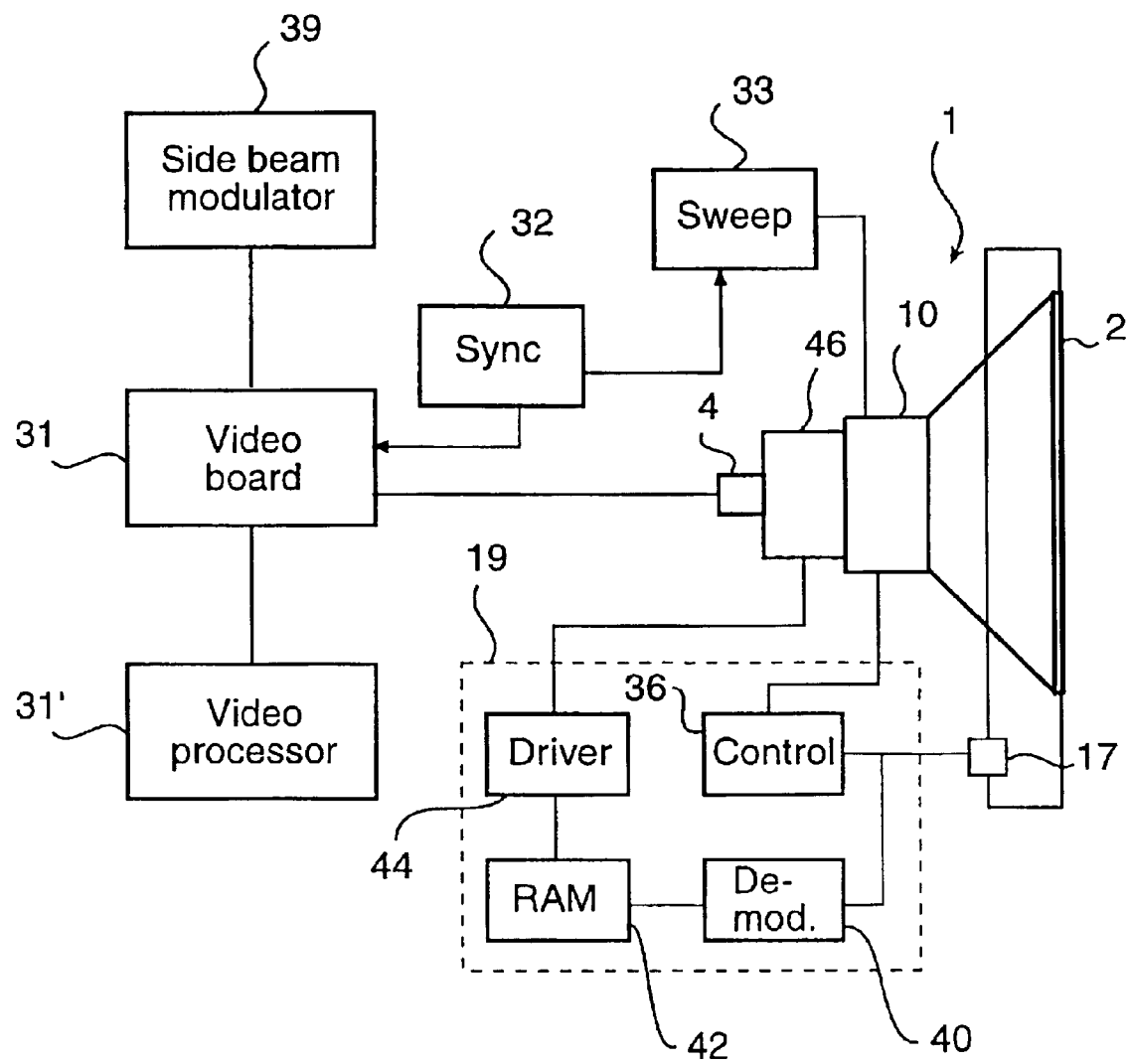
FIG. 3 is a block diagram of a control system for a tracking tube according to an embodiment of the invention.

Reference is now made to FIG. 3, illustrating a schematic diagram of a control arrangement according to an embodiment of the invention. Using the same reference numerals as in FIG. 1, the picture tube 1 comprises a screen portion 2, a set of electron guns 4, and a deflection unit 10. The electron guns are supplied with video information from a video board 31 (driven by a video processor 31'), synchronised 32 with a standard deflection control unit 33, performing the conventional sweep of the electron beams. Error signals from the detecting means in the screen are fed to the comparator 17.

In a first control arrangement 36, 10, the position errors from all of the three beams are treated together, for positioning the three beams vertically. The error signal is fed to a control unit 36, arranged to adjust the deflection unit 10. This position correction is advantageous for correction of rapid, unpredictable errors caused by external fields that influence all beams in the same way.

As the beams are separated vertically, as was shown in FIG. 2, they sweep phosphor strips belonging to different video lines. This difference in turn influences what video information each beam should contain. More specifically, in the case illustrated in FIG. 2, the upper beam should contain red video information from an earlier line sweep than the central, green beam, and the lower, blue beam should contain later information.

This signal information shift is handled by a video processor 38, comprising a memory for each video line. (Actually, two memories might be sufficient, as the lower beam can be swept in real time.) The video processor 38 is connected to the video board and influences the video signal supplied to the electron guns 4.

In order to track and control the position of each beam individually, e.g. relative beam distance, a second control arrangement 40, 42, 44, 46 is provided.

Different methods, known per se, may be used to distinguish one beam position signal from another, for example, modulation of the beam intensity or the position, causing the position error signal to vary with the modulated frequency, which must be sufficiently different from the video signal contents to be separable. Another solution is to switch on only the side beam which should be measured, while the other two beams (and the first control arrangement) are switched off. This can be done for a short period at regular or random intervals.

In the illustrated example, a side beam modulator 39 is connected to the video board, causing an intensity modulation of the beams. The second control arrangement comprises a demodulator 40 for extracting the relevant beam position information from the output from the comparator 17.

This beam position information does not need to be updated continuously, as errors affecting the beams individually are normally semi-static. Instead, the second control arrangement may comprise a RAM memory 42, for storing the detected beam errors from a complete horizontal sweep.

In the preferred embodiment, three sets of values are stored in the memory unit 42, and can be accessed by a drive unit 44 for driving a two, four and sixpole magnetic coil unit 46, e.g. comprising a PeCoMa-coil as the four and sixpole. The sets of values can be matrices of screen position-dependent beam errors for each beam that are updated whenever the periodic measurement of beam positions is performed. The magnetic coil unit 46 is used in a conventional way to control each beam individually.

It should be understood that the above description of a preferred embodiment does not exclude modifications by the skilled person within the protective scope defined by the claims. For example, the control system may be designed in a different way, depending on the application and desired result. Also, many components in the picture tube, such as the electron guns, the deflection unit and video board have not been described in any detail, as the skilled person is expected to have sufficient knowledge of this technical field.

What is claimed is:

1. A picture tube (1) comprising
a screen (2) with a plurality of interspersed sets of parallel strips (5a, 5b, 5c) of light-emitting material, each set emitting light of a specific color when hit by electrons,
a plurality of electron guns (4), each adapted to generate an electron beam (9) associated with the strips in one of said sets of strips,
a deflection unit (10) for deflecting each electron beam onto one of the strips in the corresponding set of strips, thereby exciting this strip to emit light, and
at least one pair of comb-shaped electron-detecting means (12, 13) having a plurality of interdigitated finger portions (14, 15) extending parallel with the strips (5), for generating a signal (18) relative to the position of an electron beam (9) with respect to the strips (5),
characterized in that the deflection unit (10) is arranged to deflect the beams onto selected strips (22r, 22g, 22b) having coincident sides which neighbour finger portions (14, 15) of the same detecting means (12, 13), said selected strips (22r, 22g, 22b), excited by the electron beams, being separated by at least one unexcited strip, respectively.

2. A picture tube as claimed in claim 1, wherein said selected strips (22r, 22g, 22b) are separated by one unexcited strip.

3. A picture tube as claimed in claim 1, wherein, along the length of said pair of detecting means (12, 13), one side of each strip (22r, 22g, 22b) neighbours a finger portion of a first detecting means (12), and another side of each strip (22r, 22g, 22b) neighbours a finger portion of a second detecting means (13).

4. A picture tube as claimed in claim 1, wherein said picture tube has three electron guns (4).

5. A picture tube as claimed in claim 1, further comprising means (31) for generating a plurality of time-shifted, color-specific video signals, which are supplied to the electron guns (4).

6. A picture tube as claimed in claim 1, wherein the detecting means are conductive electrodes (12, 13).

7. A picture tube as claimed in claim 1, wherein the detecting means are made of light-emitting material.

8. A picture tube as claimed in claim 1, wherein signals from said detecting means (12, 13) are used in two separate feedback control arrangements,
a first control arrangement (36, 10) being adapted to track and control the plurality of beams (9) simultaneously, and
a second control arrangement (40, 42, 44, 46) being adapted to track and control the position of individual beams (9),
said first control arrangement having a higher error update frequency than said second control arrangement.

9. A picture tube as claimed in claim 8, wherein said second control arrangement further comprises a memory (42) for storing the position error for individual beams.

10. A picture tube as claimed in claim 8, wherein said second control arrangement further comprises a magnetic coil unit (46) controlled by a drive unit (44).

11. A picture tube as claimed in claim 8, wherein said picture tube comprises means (39) for modulating at least one of said electron beams.

12. A picture tube as claimed in claim 11, wherein said second control arrangement further comprises means (40) for demodulating said signal (18) for detecting the postion of each beam (9r, 9g, 9b).

* * * * *